FORKLIFT DUMPING MEANS

Original Filed June 6, 1966 2 Sheets-Sheet 1

INVENTOR.
WILLIAM A. ALLEN
BY C. F. Stratton
ATTORNEY

FORKLIFT DUMPING MEANS

Original Filed June 6, 1966 2 Sheets-Sheet 2

INVENTOR.
WILLIAM A. ALLEN
BY C. G. Stratton
ATTORNEY

United States Patent Office

Re. 26,988
Reissued Nov. 24, 1970

26,988

FORKLIFT DUMPING MEANS

William A. Allen, San Bernardino, Calif., assignor to Jarke Corporation, a corporation of Illinois Original No. 3,360,143, dated Dec. 26, 1967, Ser. No. 555,611, June 6, 1966. Application for reissue Dec. 31, 1968, Ser. No. 794,830

Int. Cl. B65b *69/00*

U.S. Cl. 214—317 4 Claims

Matter enclosed in heavy brackets [ ] appears in the original patent but forms no part of this reissue specification; matter printed in italics indicates the additions made by reissue.

ABSTRACT OF THE DISCLOSURE

Forklift dumping means provided with shiftable means to pivotally couple a container to the upper end of the vertical guide of a forklift so the container may tilt forwardly as the lift is lowered for dumping of its contents. The container and the shiftable means cooperating to provide a "fail-safe" means to prevent accidental dislodgment of the container from the lift. The means is designed to allow separating of the container from the coupling means only when the container is upright.

This invention is a continuation-in-part of my pending application, bearing the same title, Serial No. 443,483, and filed March 29, 1965, and now abandoned.

This invention relates to means for coupling a container to the upper end of the vertical guide of a forklift, whereby the same provides a fulcrum on which the container tilts forwardly as the lift is lowered to dump the contents of the container. An object of the present invention is to provide dumping means as characterized above.

Another object of the invention is to provide interengaging means partly on the upper end of a forklift vertical guide and partly on the lower rear portion of the container that, when coupled as the container-elevating means is lowered from a position in which the container is above the means on the guide, affords a fulcrum on which the container is dumped in a forward direction.

A further object of the invention is to provide means, as above characterized, that provides "fail-safe" improvements that prevent accidental dislodgment of the container from the means that affords the fulcrum on which the container tilts to dump its contents.

A still further object of the invention is to provide container-engaging means that prevents dislodgment of the container in all tilted positions thereof, such dislodgment or separation being capable of being effected only when the container is in upright position.

This invention also has for its objects to provide such means that are positive in operation, convenient in use, easily installed in a working position and easily disconnected therefrom, economical of manufacture, relatively simple, and of general superiority and serviceability.

The above objects are realized in a construction that provides a container having horizontally aligned pivot or fulcrum pins fixedly provided at the opposite rear corners, and is provided with oppositely directed brackets that mount operator-controlled arms which are movable by the operator between retracted positions providing clearance for the container to be elevated by the lifting component of the forklift to a level above the retracted arms, and projected positions locating hook portions of said arms in the path of movement of the mentioned pins, as the container is being lowered, to cause said pins to couple with said hook portions. Continued lowering movement of the lifting component of the forklift allows the container to fulcrum around the axis of said pivot pins so the contents of the container are dumped in a forward direction. Upon again raising the container and uncoupling the pins thereof from the hooks on said arms so the latter may be again retracted, the container may be lowered to the ground. The containers forwardly of the fulcrum pins are provided with pins so spaced from the fulcrum pins that said hooks may pass therebetween, enabling the container, when horizontally disposed, and the hook-provided arms to be separated. Said forwardly spaced pins and the bottom of the container, when the latter is in any other position, restrict dislodge-movement between the hooks and the pivot pins, providing the contemplated "fail-safe" feature of the invention.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

Figure 1:
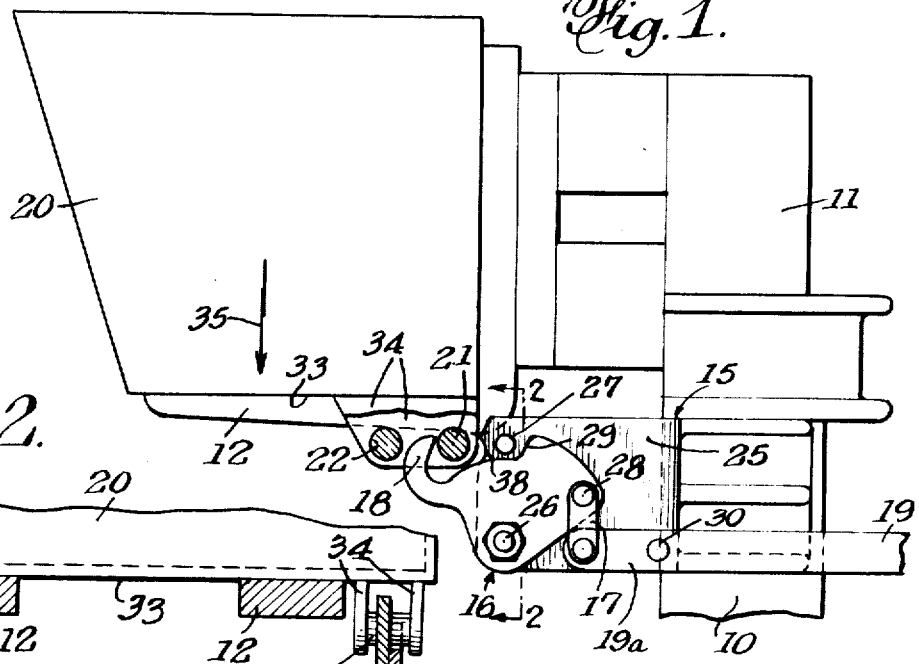
FIG. 1 is a side elevational view of the upper end of a forklift provided with the dumping means of the present invention in a position preparatory to coupling the container that is to be dumped.
Figure 2:
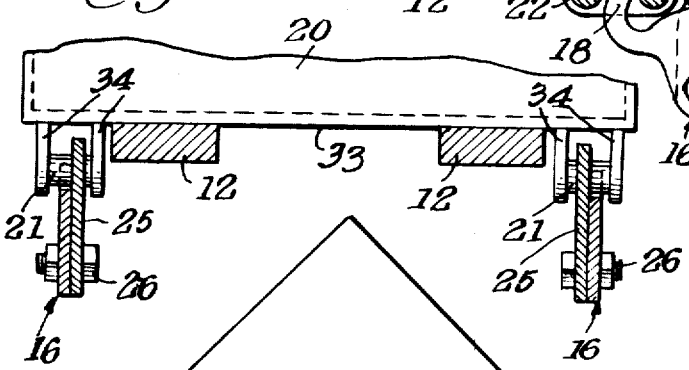
FIG. 2 is a cross-sectional view, to a reduced scale, as taken substantially on the line 2—2 of FIG. 1.

The forklift is represented by the upper end of its vertical guide 10, the lift component 11 operating in said guide under hydraulic or other power typically used for raising and lowering said component, and a pair of lift fingers 12 extending forwardly from said component 11 and which, in the usual way, are insertable under a load to lift the same during raising of said component. Other portions of the forklift have been omitted since the same form no part of the present invention, the illustrated elements 10, 11 and 12 functioning in a typical manner, as explained.

The above-described forklift is provided with the present dumping means which comprises, generally, oppositely arranged brackets 15 affixed to the upper end of the guide 10, an arm 16 pivotally mounted on each bracket and provided with an operating link 17 and a hook end 18, an operating lever 19 connected to one of said links 17 and arranged, as will later be seen, for operator control to move said arms 16 between retracted and projected operating positions, a trash or similar container 20, horizontally aligned pivot pins 21 affixed to the opposite rear corners of the container, said pins, when the container 20 is supported on the lift fingers 12 with the litf component 11 raised, being first located above the hook ends 18 of the retracted arms 16, and then lowered and engaged with the hook ends when said arms are projected, to pivotally couple the container to the forklift so the container will tilt on the pivot thus formed to dump its contents, upon continued lowering of the lift components 11, and a second pair of aligned pins 22 forwardly spaced from the pins 21 and comprising hook-retainers.

The brackets 15 are preferably affixed to the sides of the vertical guide 10, each bracket being provided with a vertical wall 25, said walls being parallel and extending forwardly from the front face of the guide 10. Said walls 25 are provided with transversely aligned pivots 26 and stop pins or lugs 27, both adjacent the forward edges of said walls.

The arms 16 are alike and are carried on the pivots 26 to swing in vertical planes preferably on the outer sides of walls 25, each arm 16 having the mentioned operating link 17 pivotally attached thereto and the hook end 18 which extends at about a right angle to the pivot 28 of the link 17. Each arm 16 is also provided with an abutment edge 29 which, together with the hook end 18 constitute limiting stops which cooperate with the stop pin 27 to stop the arm with its hook end retracted or projected according to whether the operating lever 19 is pushed or pulled. Said levers 19 are operator controlled and represent means suitable to move thearms 16 to retracted or projected positions, as desired.

In practice, only one lever 19 is provided, the same having an arm 19a that connects with the link 17 on one of the arms 16. A transverse shaft 30, at one end, comprises a pivot for the operating lever 19 and an arm, similar to the arm 19a, is provided on the opposite end of said shaft and is connected to the link 17 of the arm 16 at the opposite end. A spring 31, through a lever 32, normally biases the lever 19 to the stowed position of the arms 16, as in FIG. 7, said lever 19, against the bias of spring 31, moving the arms 16 to hook-projecting positions later explained herein.

The container 20 may comprise any suitably formed receptacle that is open at the top, has a bottom 33 such that the same may rest upon the lift fingers 12, and extension walls or brackets 34 arranged in pairs, at each side, the pivot pins 21 and hook-retaining pins 22 spanning across the walls of said brackets, the same being transversely spaced according to the spacing of the hook ends 18 of the arm 16.

OPERATION

Figure 3:
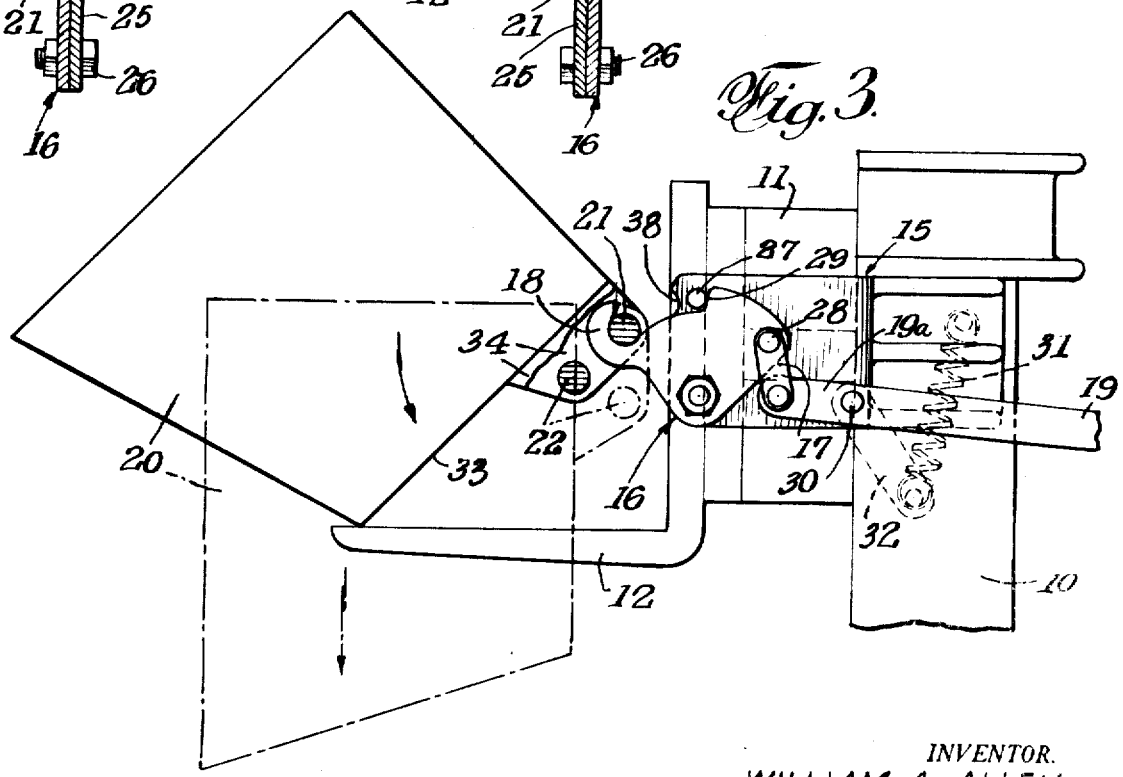
FIG. 3 is a similar view showing the container coupled to the dumping means and in an intermediate tilted dumping position as well as a full dump position.
Figure 7:
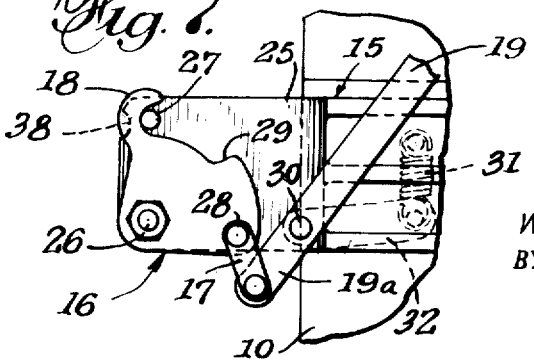
FIG. 7 is a side elevational view of the dumping means in stowed position clear of the container during its movements.

When the lift 11 is extended and the forks or fingers 12 thereof support a container 20, and said lift is being lowered according to the arrow 35, the normally stowed hooks 18, from the position of FIG. 7, are projected by pulling on the lever 19. As shown in FIG. 1, the pins 21 become engaged with the hooks 18. Continued lowering of the forks 12 causes the container to first pull the arms 16 to the out or projected position limited by stop pins 27, then allows the container to swing downwardly while in total hooking engagement with the hooks 18, first to the full-line angular position, then, to the pendant dot-dash line position of FIG. 3. The latter is the full dump position.

Figure 4:
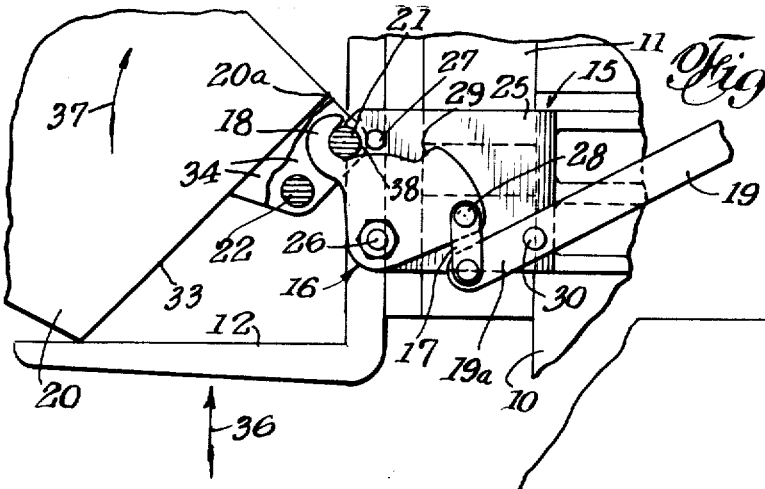
FIGS. 4, 5 and 6 are views, similar to FIG. 3, showing three other container-dumping means relationships.
Figure 6:
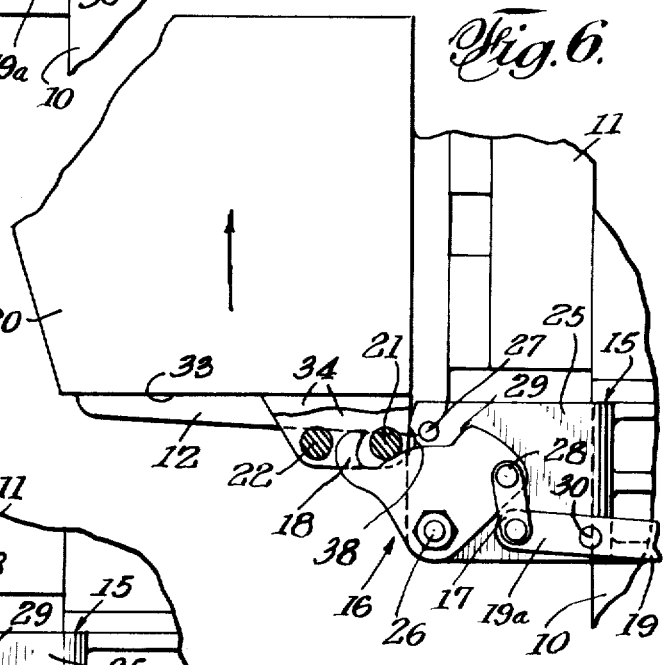
Figure 5:
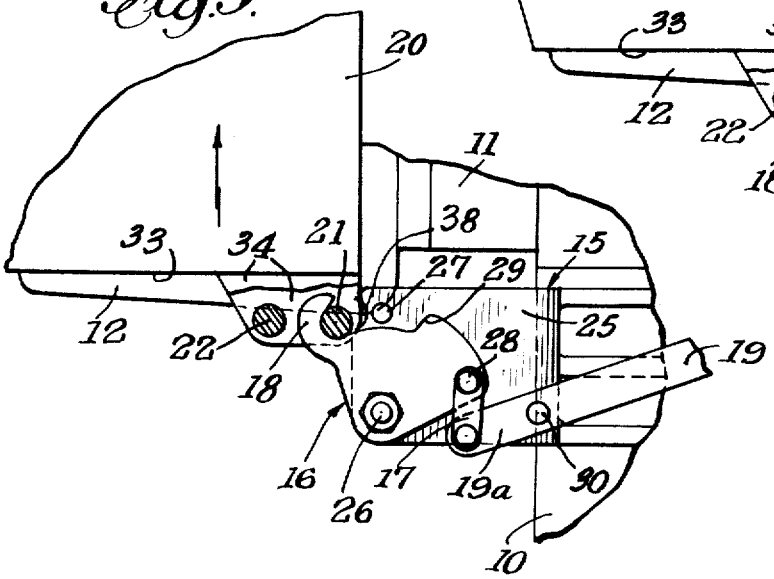

Upon subsequent upward movement of the forks 12, as indicated by arrow 36 of FIG. 4, the container 20 is caused to swing upwardly according to arrow 37. Due to the bias of spring 31, the arms 16 are retracted from the full projected position of FIG. 3, the pins 21 being pushed by the forks toward the outer edges of the walls 25 and into notches or recesses 33. As seen in FIG. 4, the lower rear corner 20a of the container 20, as the latter pivots around the axis of pins 21, is about to engage the outer vertical faces of the forks. When this occurs, just before the container bottom achieves the horizontal position of FIG. 5, the pins 21 are withdrawn from the recesses 38 against the bias of the spring 31, as in FIG. 5, preparatory to moving upwardly. As shown in FIG. 6, the initial upward movement causes the pins 21 to cam the hooks open freeing the container for continued upward movement.

When the container 20 is pendent or angular, as in FIG. 4, any forces tending to dislodge the pins 21 from engagement with the hooks 18 are prevented by the hook-retainer pins 22 that encounter the hooks 18 when such dislodging tendency occurs. When the container bottom 33 achieves horizontal position, relative vertical separation movement of the container from the hooks may be effected, as in FIG. 6. Thus, only when the container is fully supported on the forks, can the pivot between the container and the hooks be disengaged. In all other positions of the container, its bottom and the rentainer pins restrict any movement between the hooks and the pivot pins 21 that could cause disengagement.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. In a forklift for raising and dumping a container having a bottom and a rearwardly directed face and provided with aligned pivot [pins] *means* at the rear corners between said bottom and face, said forklift having a vertical guide, a lift component operable in said guide, and lift forks extending forwardly from said component, (a) forwardly extending brackets affixed to the opposite sides of the upper end of said guide, (b) an arm pivotally mounted on each bracket and movable between retracted and projected positions, (c) [spring] means to bias the arms to retracted position, (d) means to move the arms to projected position against [the bias of said spring] *said biasing* means, (e) each arm being provided with a hook portion that is rearwardly clear of the rearward part and of the pivot [pins] *means* of the container supported by the lift forks when the arms are retracted during lifting of the [latter,] *lift forks*, each said hook portion being in the path of lowering movement of a container supported on the lift forks and of said pivot [pins] *means*, when the arms are projected, to pivotally engage said [pins] *pivot* means when the lift component and the container are lowered, and (f) retainer members forwardly spaced from the pivot [pins] *means* and between which and said pivot [pins] *means* said hook portions are disposed when in hooking engagement with the pivot [pins] *means*, (g) the container, upon continued lowering movement of the lift component and the lift fingers thereof, being released for [forward] *downward* tiltable dumping movement around said hook-engaged [pins] *pivot means* as a fulcrum, the retainer members moving to hook-retaining position during such tilting movement, (h) said forwardly [directed] *extending* brackets being provided with [forwardly directed] *vertical* walls on which the arms are pivotally mounted, and stop [pins] *means* on said walls to limit the projected and retracted positions of the hook-provided arms.

2. A forklift according to claim 1 in which, (a) the forward edges of the mentioned bracket walls are provided with forwardly facing recesses in the path of rearward movement of the pivot [pins] *means* when engaged with the hook portions of the pivoted arms, and (b) the mentioned [spring bias] *biasing means* on the arms drawing said [pins] *pivot means* into engagement with the recesses when the container, in a forwardly tilted position, is caused to move toward the horizontal position by the upward vertical movement of the lift forks.

3. A forklift according to claim 2, in which, (a) the lift forks have forwardly directed faces against which the mentioned rearwardly directed face of the container is disposed when the container is in horizontally disposed position with its bottom on the lift forks and the pivot [pins] *means* thereof engaged with the hook portions of the pivoted arms, (b) the mentioned rear corners of the container, when the latter is moved by the lift forks from tilted to vertical positions, engaging the forwardly directed faces of the lift forks to provide a fulcrum around which the [pins] *pivot means,* residing in the mentioned recesses, move to withdraw from the recesses.

*4. A forklift according to claim 1, further including in combination therewith a container having a bottom, side walls, a front wall secured to said bottom along a front edge thereof and angling upwardly and forwardly therefrom, a rear wall secured to said bottom along a rear edge thereof and extending substantially perpendicularly upwardly therefrom, and aligned pivot means at the rear corners beneath said bottom, said hook portion of each of said arms of said forklift being rearwardly clear of the rear wall and of the pivot means of said container supported by said lift forks when said arms are retracted during lifting of said lift forks, each of said hook portions being in the path of said pivot means when said arms are projected to pivotally engage said pivot means when said lift component and said container are lowered, said retainer members being forwardly spaced from said pivot means and between which and said pivot means said hook portions are disposed when in hooking engagement with said pivot means, said container, upon container lowering movement of said lift component and said lift fingers thereof, being released for downward tiltable dumping movement around said hook-engaged pivot means as a fulcrum, said retainer members moving to hook-retaining position during such tilting movement.*

References Cited

The following references, cited by the Examiner, are of record in the patented file of this patent or the original patent.

UNITED STATES PATENTS

| | | | |
|---|---|---|---|
| 1,610,610 | 12/1926 | Kemper | 214—314 |
| 2,345,790 | 4/1944 | Brooks | 214—314 |
| 1,768,149 | 6/1930 | Remde | 214—317 XR |
| 2,069,697 | 2/1937 | Dempster | 214—317 |
| 2,289,024 | 7/1942 | Lambert | 214—317 |
| 2,705,571 | 4/1955 | Streb et al. | 214—313 XR |
| 3,125,236 | 3/1964 | Huff | 214—620 |
| 3,129,833 | 4/1964 | Townsend | 214—620 XR |

FOREIGN PATENTS

| | | |
|---|---|---|
| 1,330,859 | 3/1963 | France. |

HUGO O. SCHULZ, Primary Examiner